(12) United States Patent
Venolia et al.

(10) Patent No.: US 6,573,844 B1
(45) Date of Patent: Jun. 3, 2003

(54) PREDICTIVE KEYBOARD

(75) Inventors: Daniel Venolia, Kirkland, WA (US); Joshua Goodman, Redmond, WA (US); Xuedong Huang, Woodinville, WA (US); Hsiao-Wuen Hon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/484,079

(22) Filed: Jan. 18, 2000

(51) Int. Cl.[7] .......................... H03M 1/22; H03K 17/94
(52) U.S. Cl. .......................... 341/22; 345/173; 382/229
(58) Field of Search ............................. 341/22; 345/168, 345/173; 382/229, 230

(56) References Cited

U.S. PATENT DOCUMENTS 5,963,671 A * 10/1999 Comerford et al. ......... 345/168
6,359,572 B1    3/2002 Vale ............................. 341/23

OTHER PUBLICATIONS

Hermann Ney, Ute Essen, Reinhard Kneser, On structuring probabilistic dependences in stochastic language modelling, Computer Speech & Language 8, 1–38, 1994.

I. Scott MacKenzie, Shawn Zhang, The design and evaluation of a high–performance soft keyboard, CHI '99, Pittsburgh, PA, May 15–20, 1999, May 15, 1999. pp. 25–31.
Dario D. Salvucci, Inferring Intent in Eye–Based Interfaces: Tracing Eye Movements with Process Models, CHI '99, Pittsburgh, PA, May 15–20, 1999, May 15, 1999.
S. Chen and J. Goodman, An Empirical Study of Smoothing Techniques for Language Modeling, Computer Science Group, Harvard University, TR–10–98, Aug. 1998, pp. 1–64.
Andrew W. Golding, Yves Schabes, Combining Trigram-based and Feature Based Methods, Mitsubishi Technical Report, TR 96–03a, May 1996, pp. 69–78.
John W. Miller, Fil Alleva, Evaluation of a Language Model using a Clustered Model Backoff, Proceedings of ICSLIP 96, pp. 390–393, 1996.

* cited by examiner

Primary Examiner—Timothy Edwards
(74) Attorney, Agent, or Firm—Westman, Champlin & Kelly, P.A.; S. Koehler'

(57) ABSTRACT

Predictive keyboards, such as predictive soft keyboards, are disclosed. In one embodiment, a computer-implemented method predicts at least one key to be entered next within a sequence of keys. The method displays a soft keyboard where the predicted keys are displayed on the soft keyboard differently than the other keys on the keyboard. For example, the predicted keys may be larger in size on the soft keyboard as compared to the other keys. This makes the predicted keys more easily typed by a user as compared to the other keys.

21 Claims, 6 Drawing Sheets

PREDICTIVE KEYBOARD

RELATED APPLICATION

The present application is related to the cofiled, copending, and co-assigned case entitled "Fuzzy Keyboard".

FIELD OF THE INVENTION

This invention relates generally to devices having soft keyboards, and more particularly to such keyboards in which the next key that will be pressed by the user is predicted.

BACKGROUND OF THE INVENTION

Small computerized devices that fit into the palm of one's hand, generally referred to as personal-digital-assistant (PDA) devices, have become increasingly popular. They allow users to look up and record information where computer access is inconvenient, such as when in one's car, while shopping at the mall, during a business meeting, etc. Unlike a typical desktop or laptop computer, which has an actual physical, or "real," keyboard for text and data entry, a PDA device usually only has a small number of buttons, and a small touch-sensitive area on which a pen-like implement called a stylus can be used. For text entry on such a device, the user is able to write letters or symbols corresponding to letters on the touch-sensitive area with the stylus, which the device attempts to recognize.

However, for a variety of reasons, some users prefer not to input text into these devices in this manner. Therefore, most PDA devices also permit a second form of text and data entry. An image of a regular keyboard is displayed on the small display of a PDA device, such that a user is able to select which key to "type" next by tapping the stylus on the part of the image of the keyboard corresponding to the desired key. Such an image of a keyboard being displayed on the display of a device such as a PDA device, to provide for text and data entry on the part of the user by tapping the parts of the image corresponding to keys of the keyboard, is known as a "soft" keyboard.

A disadvantage with such soft keyboards is, however, that the displayed keys of the keyboard on the display of the PDA device are very small, since the display of the device as well as the device itself are small. This means that users are apt to tap incorrect keys, especially when "typing" quickly, and also that users are apt to type more slowly using soft keyboards, because of the dexterity required in order to achieve a high accuracy rate when typing. This limits the usefulness of these PDA devices, since they cannot very conveniently be used for quick and/or large amounts of text and data entry. For this and other reasons, there is a need for the present invention.

SUMMARY OF THE INVENTION

The invention relates to predictive keyboards, such as predictive soft keyboards. In one embodiment, a computer-implemented method first predicts at least one key to be entered next within a sequence of keys. The method displays a soft keyboard where the predicted keys are displayed on the soft keyboard differently than the other keys on the keyboard. For example, the predicted keys may be larger in size on the soft keyboard as compared to the other keys, making them more easily typed by a user as compared to the other keys.

Embodiments of the invention provide for advantages not found within the prior art. While the overall size of the soft keyboard of a personal-digital-assistant (PDA) device is still small, the keys that are determined as most likely to be entered next by the user are relatively larger in size than the other keys. This makes it easier for a user to type them as compared to the other keys, and as compared to keys on soft keyboards found in the prior art.

For example, if a user begins typing a sequence of keys "t" and then "h," an embodiment of the invention may predict that the key the user will enter next is "e" or "r". By displaying the "e" and "r" keys larger in size than the other keys on the keyboard, the embodiment of the invention makes it easier for the user to select either of these keys as the next key within the sequence. This makes for more convenient data and text entry on PDA devices, increasing their usefulness.

The invention includes computer-implemented methods, machine-readable media, computerized devices, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
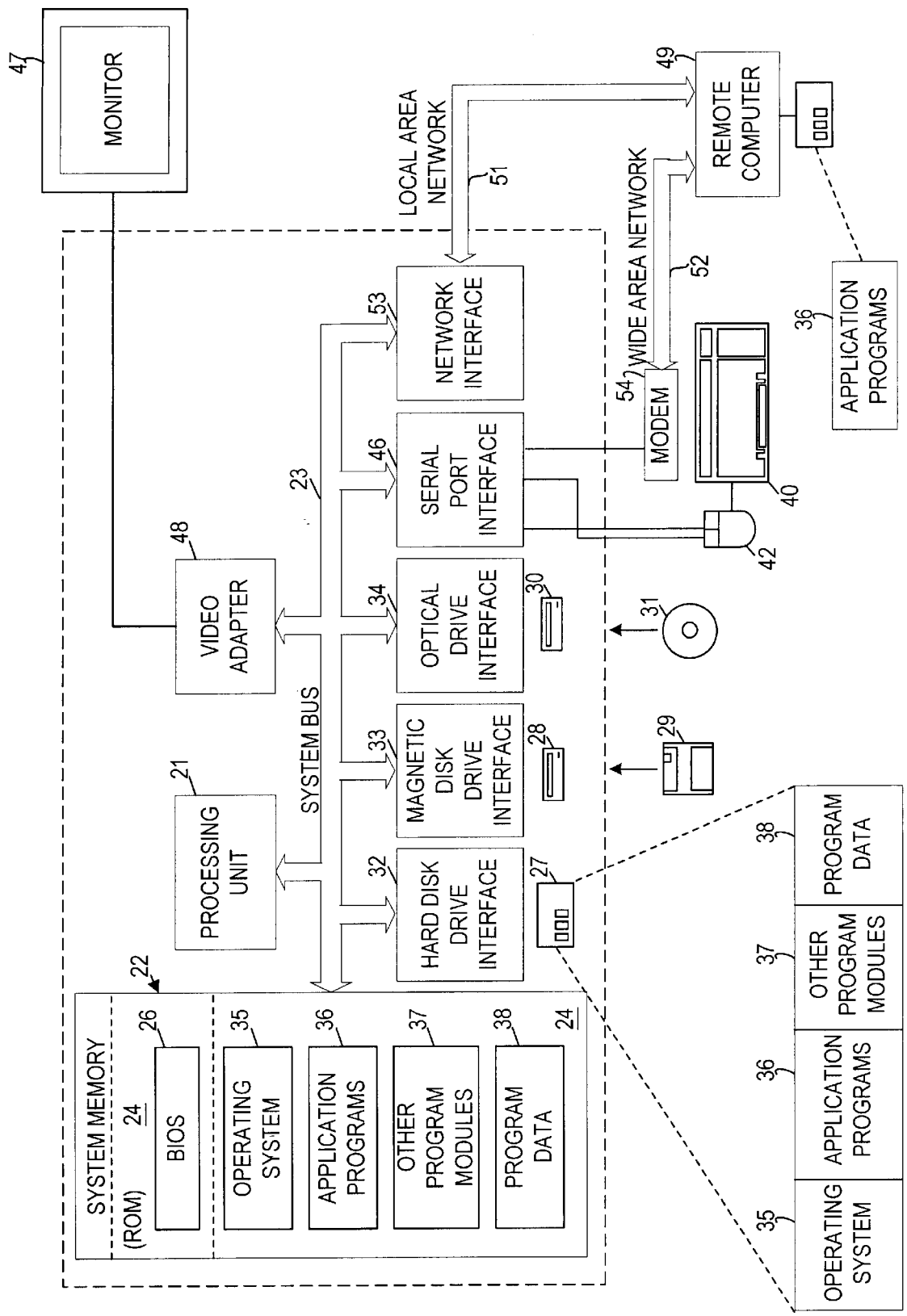
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. It is noted that the description provided of FIG. 1 is of a general personal computer, in conjunction with which some embodiments of the invention can be practiced. Other embodiments of the invention, however, are meant for use in conjunction with devices that do not have physical keyboards, such as personal digital assistant (PDA) devices, as known within the art, and as can be appreciated by those of ordinary skill within the art. That is, the invention is not limited to the description of the computing environment described in this section of the detailed description.

The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges,.random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one, or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to One or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Operation

Figure 2:
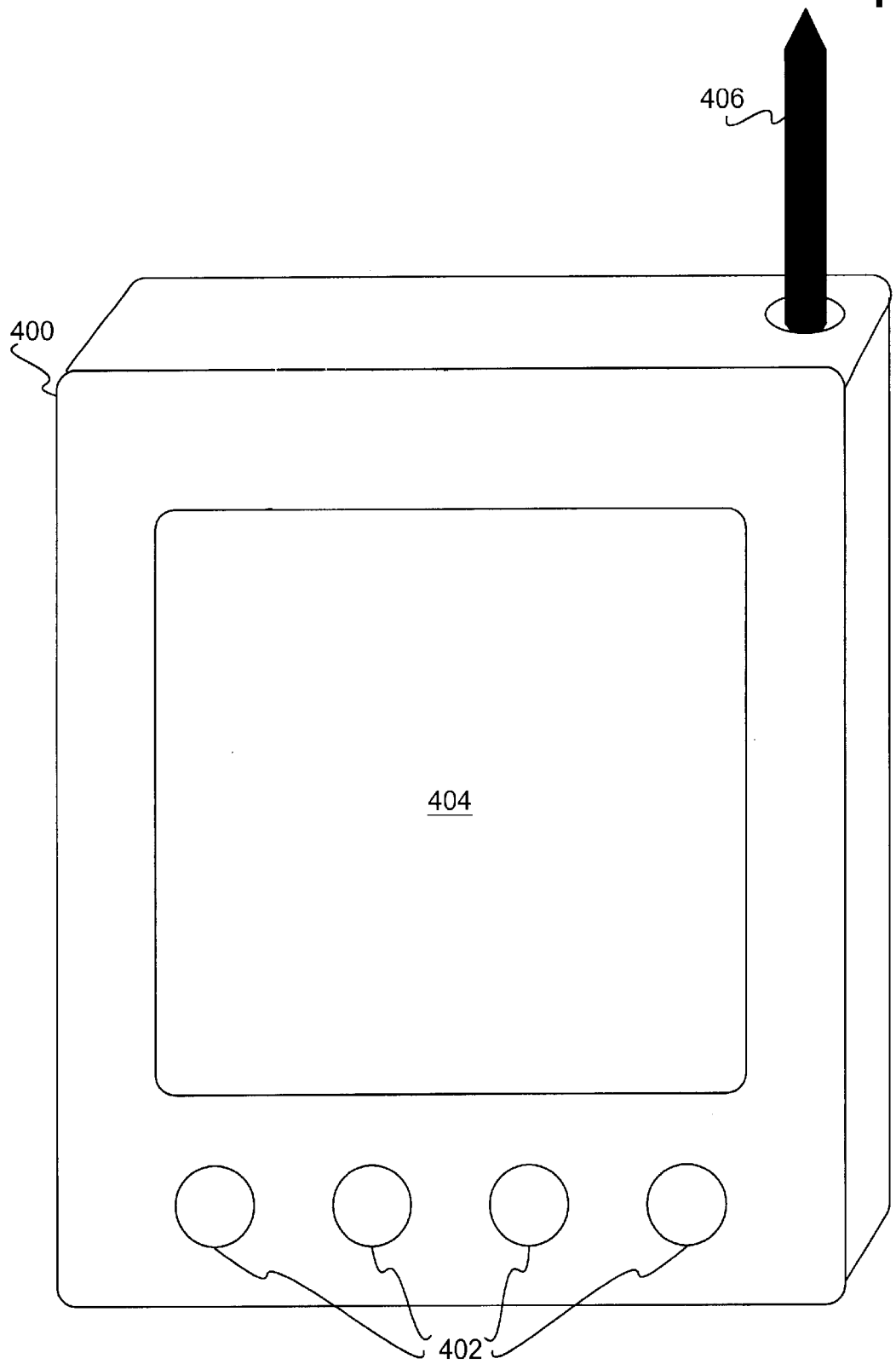
FIG. 2 is a diagram of a representative personal-digital-assistant (PDA) device in conjunction with which embodiments of the invention may be practiced.

In this section of the detailed description, the operation of varying embodiments of the invention is described. First, a representative personal-digital-assistant (PDA) device in conjunction with which embodiments of the invention may be practiced is shown in FIG. 2. The device 400 includes a number of controls 402 and a touch-sensitive display 404. The display 404 allows for both the device 400 to display information thereon, as well as receive input via the user tapping or writing against it, such as with an implement like the stylus 406. The stylus 406 as shown in FIG. 2 can be stored in a slot within the device 400 itself. Depending on the particular PDA device, the controls 402 can cause any of a number of different functionality when pressed. For example, in one type of PDA device, actuating a given control 402 causes an application program associated with that control to be run on the device, such as a note pad program, a calendaring program, etc.

The invention is not limited to a PDA device such as that shown in FIG. 2, and the device of FIG. 2 is shown for illustrative purposes only. In particular, embodiments of the invention are amenable to application to any PDA device, such as (but not limited to) PDA devices that run the PalmOS®, such as those available from HandSpring, Inc. and Palm Computing, Inc., as well as such devices that run the Microsoft® Windows® CE operating system, such as those available from Casio, Hewlett-Packard, Compaq, and other vendors. Embodiments of the invention are also amenable to application to standard desktop computers, such as that described in the previous section of the detailed description, as well as other devices, such as devices commonly referred to as electronic books, or e-books.

The PDA device of FIG. 2 shows a display 404 that is touch-sensitive, and therefore allows for output to be displayed thereon, as well as input to be entered thereon. However, other PDA devices may be such that only a part of their displays are able to accept input, while still other PDA devices may have a separate touch-sensitive area apart from their display for input. All of these alternative devices are nevertheless amenable to application to embodiments of the invention.

Figure 3:
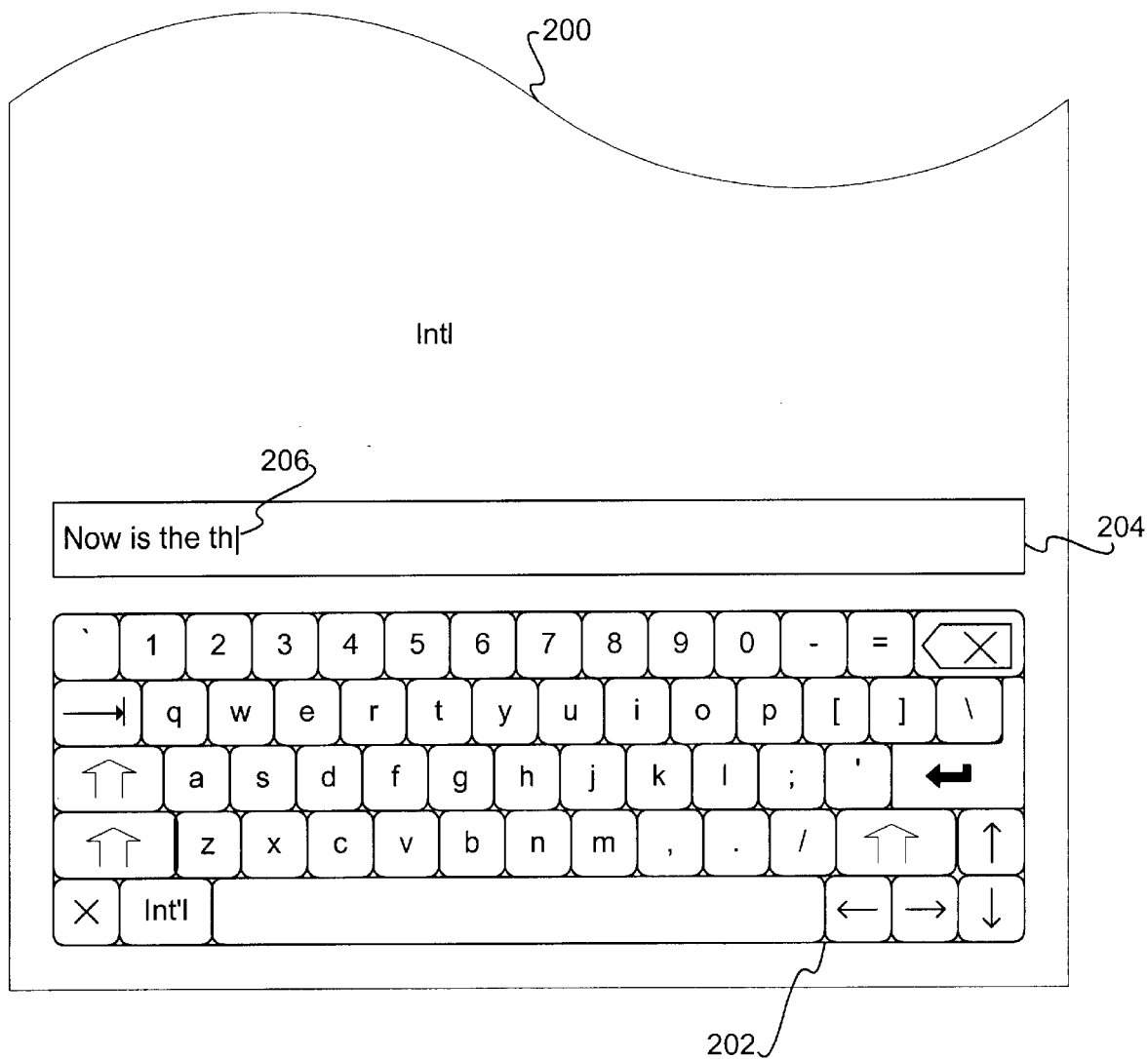
FIG. 3 is a diagram of a soft keyboard.

Referring next to FIG. 3, a diagram of a soft keyboard in conjunction with which embodiments of the invention may be practiced is shown. The display area 200 is one part of a display of a device, such as the display 404 of the device 400 of FIG. 2. The display area 200 includes a soft keyboard 202, and a text-entry box 204. The soft keyboard 202 is an image of a real keyboard displayed on the display 404. Because it is not an actual, physical keyboard, the keyboard 202 is referred to as a "soft" keyboard. "Typing" on the keyboard 202 means tapping on the parts of the display on which the desired keys of the keyboard 202 are displayed, with a stylus or other implement, to cause the device to recognize that inputs have been made. The resulting keys that have been typed are shown in the text-entry box 204.

For example, in the diagram of FIG. 3, the user has tapped the parts of the display screen corresponding to the keyboard keys SHIFT, n, o, w, space, i, s, t, h, e, space, t, h, such that the key sequence "Now is the th" is shown within the text-entry box 204. The indicator 206 shows where the next-entered key will be inserted within the text-entry box 204. If the user has made a mistake, he or she can type the backspace key to erase characters immediately to the left of the indicator 206, or type the cursor-left key to cause the indicator 206 to move to the left within the key sequence shown in the text-entry box 204. In other words, the soft keyboard 202 operates substantially as a real, physical keyboard otherwise does, and as known within the art.

In implementation in a PDA device, the soft keyboard 202 of FIG. 3 may measure only three inches wide by one inch high, for example. That is, the soft keyboard 202 consumes only a part of the space of the display area 200, which is itself typically relatively small. Thus, individual keys on the soft keyboard 202 are quite small, making for inconvenient typing on the keyboard. Users are apt to tap the incorrect key when attempting to type a desired key sequence, as has been described in the background section. Embodiments of the invention attempt to overcome this disadvantage of small, palm-sized devices.

Figure 4:
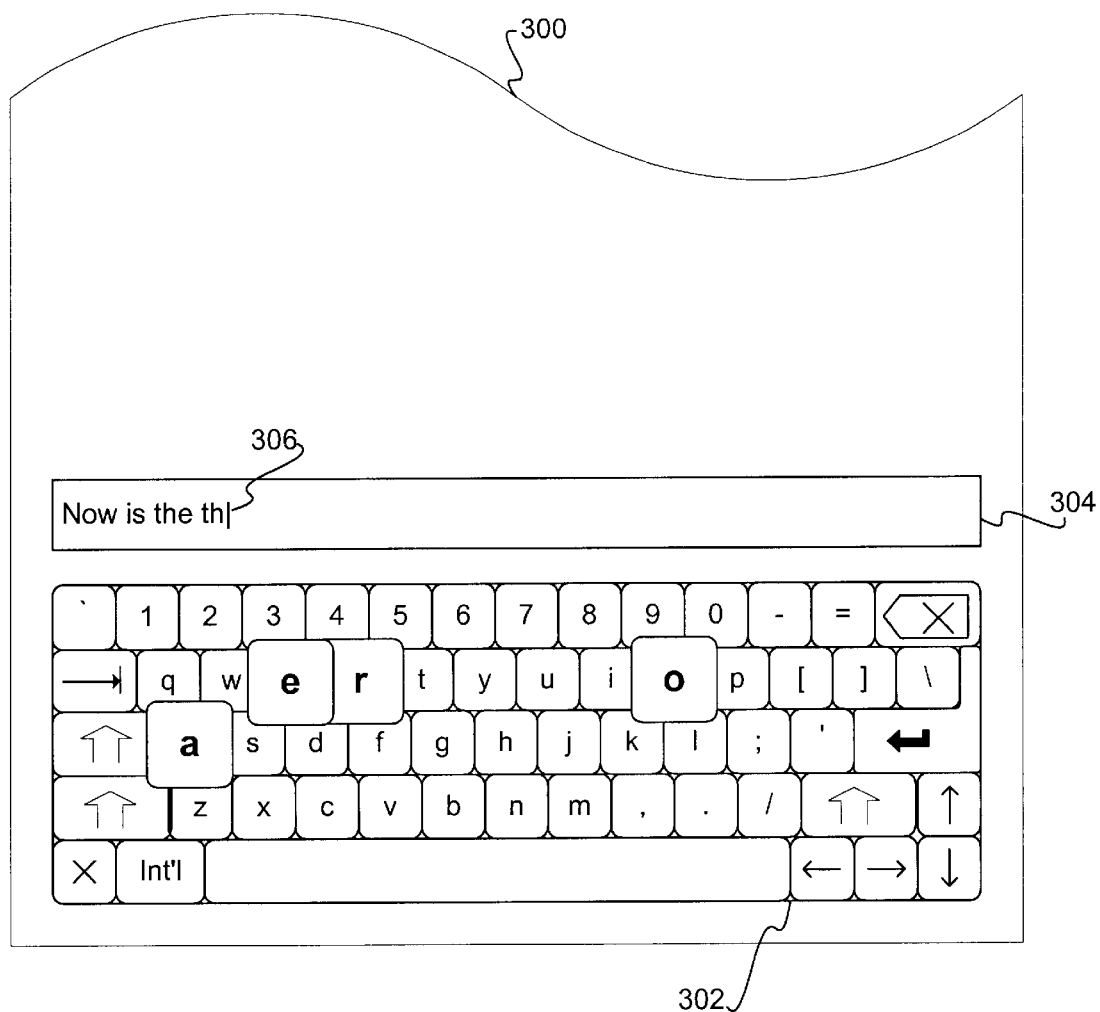
FIG. 4 is a diagram of a soft keyboard according to an embodiment of the invention.

A soft keyboard according to an embodiment of the invention is shown in FIG. 4. The soft keyboard 302 and the text box 304 are displayed on the display area 300, similar to the soft keyboard of FIG. 3. An insertion point within the text box 304 indicates where the next text character within the key sequence will be entered. As in FIG. 3, the text box 304 of FIG. 4 already has displayed there in the key sequence "Now is th".

Embodiments of the invention attempt to overcome the difficulty of typing on a soft keyboard 302 by predicting at least one key that is likely to be entered next, and displaying those keys differently on the soft keyboard 302 than the other keys on the keyboard. For example, as shown in FIG. 4, the letters a, e, o, and r have been predicted as likely to be the next key desired to be entered by the user in the key sequence "Now is th". So that these keys are easier to type, they are displayed as larger in size on the soft keyboard 302. However, the other keys are not entirely obscured, just in case the prediction is incorrect, and the user desires to type a key other than the keys corresponding to the letters a, e, o, and r. Thus, insofar as predictions as to which keys are to be entered next are accurate, embodiments of the invention promote faster typing on soft keyboards, by rendering the keys on the soft keyboard likely to be entered next by the user as larger in size as compared to other keys.

In one embodiment of the invention, only keys corresponding to letters are shown differently on the soft keyboard when they are predicted to likely be the next keys entered by the user. Other keys that are predicted as likely to be the next keys entered by the user, such as the space bar, the return key, keys corresponding to numerals and punctuation marks, etc., are not displayed differently on the soft keyboard in this embodiment. Furthermore, whereas in the embodiment shown in FIG. 4, the keys on the soft keyboard 302 that are predicted as likely to be entered next by the user are shown as larger in size than the other keys, the invention itself is not limited to this specific manner of displaying such keys differently on the soft keyboard relative to the other keys. For example, in another embodiment, the keys can be displayed in a different color as compared to the other keys.

On the soft keyboard 302 of FIG. 4, the "e" key is shown as overlapping the "r" key, where both of these keys are larger in size than normal to indicate that they have been predicted as likely to be entered next by the user within the key sequence shown in the text box 304. In one embodiment, this is because a prediction that the "e" key is likely to be entered next was made with greater confidence than a prediction that the "r" key is likely to be entered next. In other words, in one embodiment, the predicted keys that are displayed differently on the screen, such as by being sized larger relative to the other keys, are displayed in front-to-back order by their probabilities to be entered next by the user. That the "e" key is shown overlapping the "r" key in FIG. 4 thus indicates that the prediction made is that the "e" key has a higher probability to be entered next than does the "r" key. The "a" key and the "o" key are not affected, because they do not overlap with other keys that have been predicted as likely to be entered next by the user.

The operation of varying embodiments of the invention has been described. In the next section of the detailed description, the manner by which predicting keys likely to be entered next is accomplished, according to an embodiment of the invention, is described. Sections thereafter then present methods and systems of varying embodiments of the invention.

Predicting Keys Likely to Be Entered Next

In this section of the detailed description, the manner by which keys are predicted as likely to be entered next by the user is described in accordance with varying embodiments of the invention. The invention is not limited to the manner described herein, however. In particular, the manner described herein relies on a statistical model, such as a statistical character model or a statistical word model, as will be described. In one embodiment, the model uses as input the key sequence that has already been entered by the user. More specifically, the "left context" of the key sequence is used as an input to a statistical model for prediction; that is, only the characters that lie to the left of the insertion indicator, are used as input.

In one embodiment, a statistical character model is used, such as what is known and available in the art as a "letter n-gram" model. A "letter n-gram" model is a statistical model of a corpus of text that counts the occurrences of each string of n letters. For example, a letter trigram (n=3) stores the number of times each trio of letters appears: aaa, aab, aac, ..., aba, abb, abc, ..., zzx, zzy, zzz. A letter n-gram can beused to predict the next letter by using the n−1 characters to the left of the selection as the context. Each letter "a" through "z" is appended to the context, and the resulting sequences are looked up. Such sequence counts are easily converted to a probability by dividing by their total.

The letter trigram model may be made more robust to unexpected data by using a statistical technique known as smoothing; thus the trigram model can be smoothed with the bigram (n=2) and unigram (n=1) models. In the most simple smoothing model, a weighted average is taken between the n prediction vectors. A larger n predicts more accurately than a smaller n.

In another embodiment, a statistical word model is used, as also known and available in the art. The n-gram concept described above with respect to the statistical character model can also be applied to words as well. A word trigram, for example, contains the number of times that each three-word sequence appears in the corpus. A word n-gram can be used to predict the next word given the n−1 words that come before it. The subset of those words that begin with the letters immediately to the left of the selection serve to filter the list of words. The probability distribution of the next letters in that sublist constitutes the prediction.

Word bigrams and word trigrams are very memory-intensive data structures, particularly when the number of distinct words in the corpus is substantial (e.g. 60,000). However, most speech dictation software already employs a word n-gram model. Therefore the predictive keyboard can leverage that data at no additional cost if a speech system is present within a device in which an embodiment of the invention is being implemented.

In another embodiment of the invention, dictionary data that is typically already present on a device in conjunction with which the embodiment of the invention is being implemented is used. In particular, a dictionary can act like a word unigram model, albeit minus the probability data. This impoverished language model may be useful where there is already be a dictionary present in the device, and the memory cost of adding another language model is prohibitive.

The statistical techniques described above can also be combined in one embodiment by smoothing. In particular, if the dictionary or statistical word model has little data for the current context, a statistical letter model can be mixed into the prediction. There are several techniques for doing this known in the art, including simply taking the weighted sum of a statistical letter model and a statistical word model. In one embodiment, another technique is the following. In a conventional word n-gram model, only words in some fixed vocabulary of the most frequent words (60,000 words is typical) are usually modeled, as can be appreciated by those of ordinary skill within the art. All other words are not modeled. Thus, this technique treats letters as words, and for any words not in the vocabulary, treats them as a letter sequence, terminated by punctuation or a space.

For example, let $w_1 \ldots w_k$ represent the context. If the user typed "the gvxy cat" then $w_1$=the, $w_2$=g, $w_3$=v, $w_4$=x, $w_5$=y, $w_6$=<space>, and $w_7$=cat. The length of this context can be controlled dynamically, but if $w_{k-1}$ and $w_{k-2}$ are words, would typically be about 2 (a trigram model) and if $w_{k-1} \ldots w_{k-6}$ are letters, would be about 6 (a 7-gram model). This context can then be used with smoothing techniques known in the art to produce a model of all possible letter sequences. Other language modeling techniques known in the art such as caching and clustering can also be used.

Methods

Figure 5:
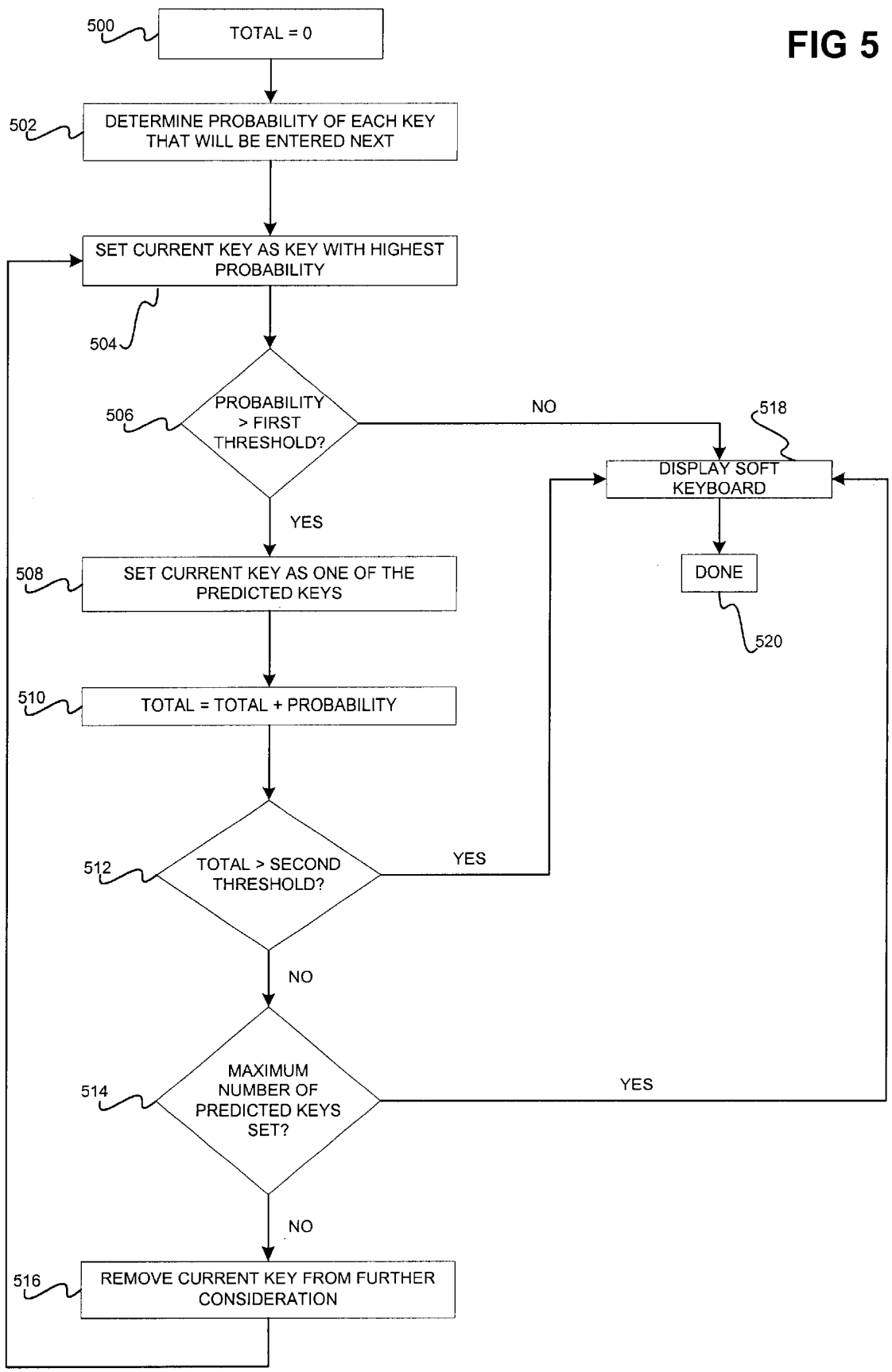
FIG. 5 is a flowchart of a method according to an embodiment of the invention; and, FIG. 6 is a diagram of a system according to an embodiment of the invention.

In this section of the detailed description, methods according to varying embodiments of the invention are presented. One particular method is shown in the flowchart of FIG. 5. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however. Furthermore, the computer, as that term is used herein, is a general term, and is meant to encompass computerized devices such as PDA devices and electronic book devices, in conjunction with which embodiments of the invention may also be practiced.

Referring now to FIG. 5, in 500 a running total variable is initially reset to zero. In 502, the probability that each key is likely to be entered next by a user is determined. For example, the probabilities may be determined as has been described in the preceding section of the detailed description, based on already entered keys as displayed within a sequence of keys on the display area of a device. Thus, a statistical character model or a statistical word model may be used to determine the probabilities in 502. Next, in 504, a variable referred to as the current key is set as the key having the highest probability. In one embodiment, if this key is not a letter key, then the key is removed from consideration, and the current key is set as the key with the next-highest probability, and the process is repeated until a letter key is set as the current key.

In 506, it is determined whether the probability of the current key is greater than a predetermined first threshold. In one embodiment, this threshold is 4%. The probability is tested against this first threshold to ensure that relatively low-probability keys are not displayed as predicted keys by an embodiment of the invention. If the probability of the current key does exceed the predetermined first threshold, then the method proceeds to 508.

In 508, the current key is set as one of the predicted keys. That is, the current key is set as one of the keys predicted to be entered next by the user within the sequence of keys already entered by the user, and desirably displayed on the display area of the device. Next, in 510, the running total variable is incremented by the probability of the current key. In 512, it is determined whether the running total is greater than a predetermined second threshold. In one embodiment, this second threshold is 80%. The running total is tested against this second threshold to ensure that if only one or two keys in total have the greatest probability to be entered next, that other keys are not also displayed as predicted keys by an embodiment of the invention. For example, if a given key has the probability to be entered next of 90%, then it is best not to display any other keys as predicted keys, since this given key has itself such a large probability of being entered next. If the running total does not exceed the predetermined second threshold, then the method proceeds to 514.

In 514, it is determined whether a predetermined maximum number of predicted keys has already been set. In one embodiment, no more than four predicted keys are determined. Thus, in this embodiment, the predetermined maximum number of predicted keys is four. If less than the predetermined maximum number of predicted keys has not been set, then the method proceeds to 516, in which the current key is removed from further consideration. The method then goes back to 504, where a new current key is selected, as the key (or, in one embodiment, a letter key) having the next-highest probability to be entered as compared to that of the current key, and the method proceeds as has been described. 500, 502, 504, 506, 508, 510, 512, 514 and 516 of the method of FIG. 5 can be characterized as the part of FIG. 5 that is used to predict at least one key (or no keys, in one embodiment) to be entered next within a sequence of keys. In the specific embodiment of FIG. 5, although the invention is not so limited, such prediction includes determining at least one key that has a probability to be entered next which is greater than a first predetermined threshold, where a total of the probabilities of all predicted keys is less than a second predetermined threshold, and where each of the at least one key has a probability to be entered next that is greater than any other keys except for the at least one key. Furthermore, such prediction in one embodiment also includes selecting only up to a predetermined maximum number of keys.

Where the probability of the current key is less than the first predetermined threshold in 506, or the running total is greater than the second predetermined threshold in 512, or the maximum number of predicted keys has been set in 514, this indicates that the determination of keys predicted to be entered next by the user is done, and the method proceeds to 518. In 518, the soft keyboard is displayed. The soft keyboard is displayed where the at least one key that has been predicted to be entered next by the user are displayed differently on the soft keyboard as compared to the other keys on the keyboard. For example, in one embodiment, such predicted keys are displayed larger in size than the other keys, while in another embodiment, such predicted keys are displayed in a different color than the other keys. The method is then finished in 520 of FIG. 5.

It is noted that where it is referred to herein that a different display is made of the predicted keys, that in embodiments of the invention, this is inclusive of changing the display and the hit area associated with the predicted keys. For example, the display of a key area is made larger, such that tapping within this larger key area actuates the key. Thus, increasing the display size of predicted keys in embodiments of the invention includes increasing the associated hit area of the keys as well.

System

Figure 6:
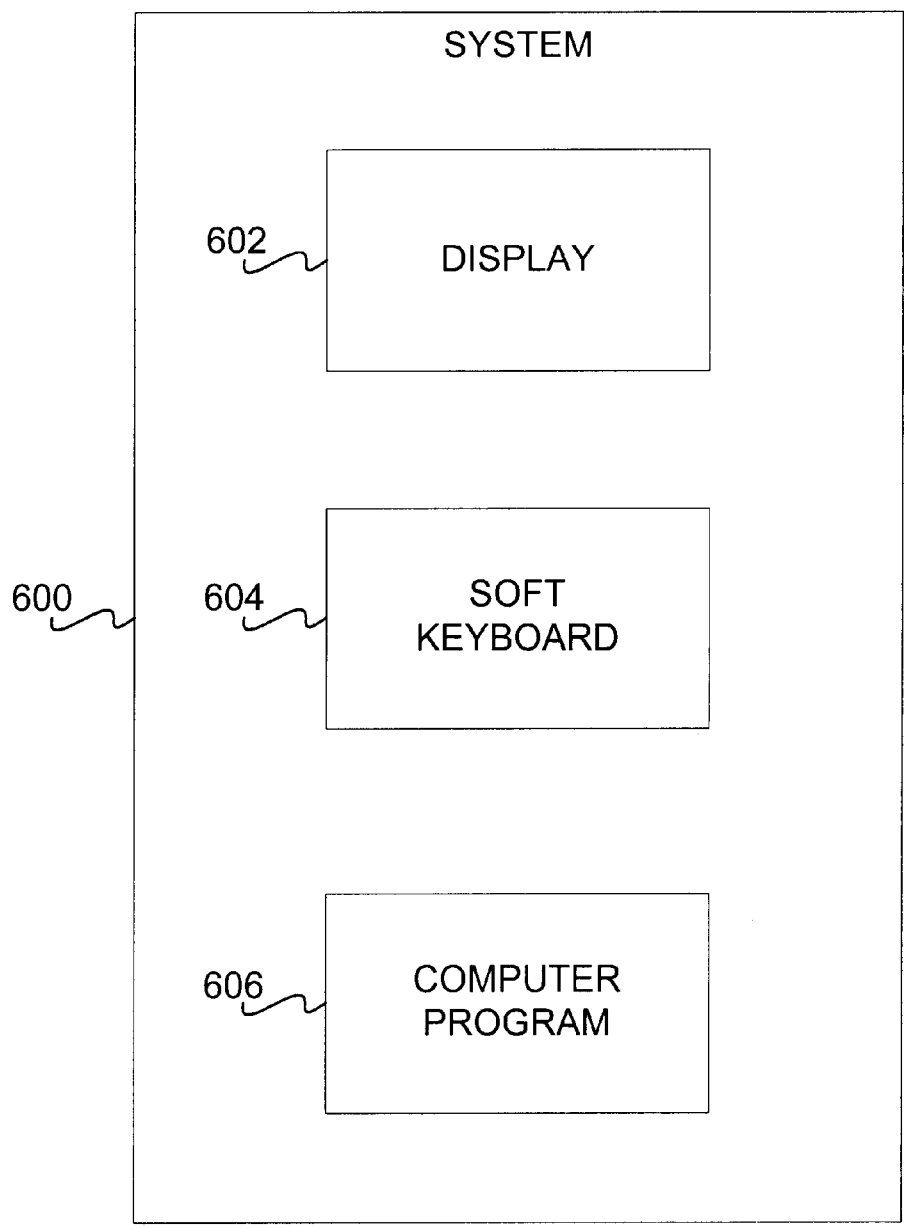

In this section of the detailed description, a system according to an embodiment of the invention is described in conjunction with FIG. 6, which is a diagram of one such system. The system 600 can be implemented as part of a personal-digital-assistant (PDA) device, an electronic book device, a standard desktop or laptop computer, etc,; the invention is not so limited. The system 600 includes a display 602, a soft keyboard 604, and a computer program 606. The soft keyboard 604 is rendered on the display 602, such that at least one predicted key to be entered next is rendered differently than the other keys on the keyboard 604, as has been described in preceding sections of the detailed description.

The computer program 606 is desirably made up of instructions to be executed by a processor (not shown in FIG. 6) from a computer-readable medium (not shown in FIG. 6) such as a volatile or non-volatile memory, or other storage such as a hard disk drive. The computer program 606 determines the at least one predicted key to be entered next, such as by performing the method described in the previous section of the detailed description. Thus, in one embodiment, the program 606 utilizes a statistical model to make this prediction, such as a word or character model as has already been described.

Pseudo-Code

One embodiment of the invention can be implemented in the pseudo-code that follows, and which is understandable to those of ordinary skill within the art. However, the invention is not limited to this embodiment. In particular, the pseudo-code presents a different embodiment by which to implement the invention as compared to the method of FIG. 5 described in a previous section of the detailed description.

```
Sub Predict()
    ' Clear out the previous highlights
    for letter = 1 to 26
        SetHighlight (letter, False)
    next letter
    ' Grab the probabilities for this context
    Dim probabilities(1 to 26)
    context = Left(field.Text,field.SelStart)
    GetProbabilities(context, probabilities)
    ' Highlight the best keys
    total = 0
    for i = 1 to MaxPredictions
        ' Find the highest-probability letter that has not yet been chosen
        bestLetter = 1
        for letter = 2 to 26
            if probabilities(bestLetter) < probabilities(letter) then
                bestletter = letter
            end if
        next letter
        ' Skip it if probability is too low
        if probabilities(bestLetter) < MinIndividualProb then exit loop
        ' Highlight the key
        SetHighlight (bestLetter, True)
        SetOrder(bestLetter, i)
        ' Exit if we've accumulated enough probability
        total = totalProbability+probabilities(bestLetter)
        if total >= MaxTotalProb then exit loop
        ' Don't consider this one the next time around
        probabilities(bestLetter) = 0
    next i
end sub
' This example uses a trigram stored as a matrix (0 to 26, 0 to 26,
1 to 26) as Long
Sub GetPredictions(context as String, probabilities(1 to 26) as Single)
    ' Get the two characters at the right side of the context string
    ' Note: CharToIndex converts a..z to 1..26, and anything else to 0
    c0 = CharToIndex(context, Len(context)-1)
    c1 = CharToIndex(context, Len(context))
    ' Total up this row in the matrix
    total = 0
    for c2 = 1 to 26
        total = total+count(c0, c1, c2)
    next c2
    ' Grab the row of the matrix as probabilities
    for c2 = 1 to 26
        probabilities(c2) = count(c0, c1, c2)/total
    next c2
end sub
```

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   predicting at least one key to be entered next within a sequence of keys, wherein predicting includes determining that the at least one key has a probability of being next entered greater than a first predetermined threshold; and
   displaying a soft keyboard where the at least one key are displayed differently on the soft keyboard than other keys on the keyboard.

2. The method of claim 1, wherein predicting at least one key further comprises selecting as the at least one key up to a predetermined maximum number of the at least one key to be predicted.

3. The method of claim 1, wherein predicting at least one key comprises:
   a) determining a probability for each potential key of a plurality of potential keys that the potential key will be entered next and selecting as a current key a potential key having a highest probability of the plurality of potential keys; and,
   b) upon determining that the probability of the current key is greater than a predetermined first threshold, setting the current key as one of the at least one key and adding the probability of the current key to a running total; and,
      upon determining that the running total is less than a predetermined second threshold, repeating b) for a new current key selected as one of the plurality of potential keys having a probability next-highest to the probability of the current key, unless a predetermined maximum number of the at least one key has already been met.

4. The method of claim 1, wherein displaying a soft keyboard where the at least one key are displayed differently on the soft keyboard than other keys on the keyboard comprises displaying the at least one key in a different color than the other keys on the keyboard.

5. The method of claim 1, wherein displaying a soft keyboard where the at least one key are displayed differently on the soft keyboard than other keys on the keyboard comprises displaying the at least one key as larger in size than the other keys on the keyboard.

6. The method of claim 5, wherein displaying the at least one key as larger in size than the other keys on the keyboard comprises displaying the at least one key in front-to-back order by probability to be entered next.

7. The method of claim 1, wherein predicting the at least one key further comprises calculating a sum of probabilities of each of the at least one key, wherein predicting terminates when the sum is greater than a second predetermined threshold.

8. The method of claim 5, wherein predicting at least one key comprises utilizing a statistical model to predict the at least one key based on already entered keys of the sequence of keys.

9. The method of claim 8, wherein utilizing a statistical model comprises utilizing one of a statistical character model and a statistical word model.

10. The method of claim 8, wherein utilizing a statistical model further comprises smoothing a character model with a word model.

11. A machine-readable medium having instructions stored thereon for execution by a processor to perform a method comprising:
    determining at least one key having a probability to be entered next within a sequence of keys, each of the at least one key having a probability greater than a first predetermined threshold, the determining comprising calculating a running total, incrementally, of the sum of probabilities of each of the at least one key from highest probability to lowest in descending order until a second predetermined threshold is reached; and
    displaying a soft keyboard when the determining terminates and where the at least one key are displayed as larger in size than other keys on the keyboard.

12. The medium of claim 11, wherein determining at least one key comprises utilizing a statistical model to determine the probability of each of the at least one key to be entered next, based on already entered keys of the sequence of keys.

13. The medium of claim 11, wherein determining terminates when the number of the at least one key reaches a predetermined maximum number of the at least one-key.

14. The medium of claim 11, wherein determining at least one key comprises:
  a) determining a probability for each potential key of a plurality of potential keys that the potential key will be entered next and selecting as a current key a potential key having a highest probability of the plurality of potential keys; and,
  b) upon determining that the probability of the current key is greater than the predetermined first threshold, setting the current key as one of the at least one key, and adding the probability of the current key to the running total; and
    upon determining that the running total is less than the predetermined second threshold, repeating b) for a new current key selected as one of the plurality of potential keys having a probability next-highest to the probability to be entered next of the current key, unless a predetermined maximum number of the at least one key has already been met.

15. The medium of claim 11, wherein displaying a soft keyboard where the at least one key are displayed as larger in size than other keys on the keyboard comprises displaying the at least one key in front-to-back order by probability to be entered next.

16. A computerized system comprising:
  a display;
  a soft keyboard rendered on the display such that at least one predicted key having a probability to be entered next are rendered differently on the display compared to other keys of the keyboard; and
  a computer program on a computer-readable medium, the computer program adapted to determine the at least one predicted key to be entered next by determining that the at least one predicted key each has a probability of being next entered greater than a first predetermined threshold.

17. The system of claim 16, wherein the computer program determines the at least one predicted key by utilizing a statistical model.

18. The system of claim 16, wherein the computer program is adapted to calculate a sum of the individual probabilities of each at least one predicted key, where the sum is less than a second predetermined threshold, and where each of the at least one predicted key has a probability to be entered next greater than any other key besides the at least one key.

19. The system of claim 16, wherein the computer program is adapted to determine up to a predetermined maximum of the at least one predicted key.

20. The system of claim 16, wherein the at least one predicted key of the keyboard are rendered as larger in size than the other keys of the keyboard.

21. The system of claim 16, wherein the at least one predicted key of the keyboard are rendered in front-to-back order by probability to be entered next.

* * * * *